(12) United States Patent
Park et al.

(10) Patent No.: US 7,012,661 B2
(45) Date of Patent: Mar. 14, 2006

(54) DISPLAY PANEL AND SYSTEM USING A HOLOGRAM PATTERN LIQUID CRYSTAL

(75) Inventors: Chan Young Park, Seoul (KR); Han Bae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 88 days.

(21) Appl. No.: 10/662,317

(22) Filed: Sep. 16, 2003

(65) Prior Publication Data

US 2004/0061827 A1    Apr. 1, 2004

(30) Foreign Application Priority Data

Sep. 17, 2002    (KR) ...................... 10-2002-0056576

(51) Int. Cl.
*G02F 1/1347* (2006.01)
(52) U.S. Cl. ...................................................... 349/74
(58) Field of Classification Search ............ 349/61–63, 349/74–82
See application file for complete search history.

(56) References Cited

U.S. PATENT DOCUMENTS

| | | | | |
|---|---|---|---|---|
| 5,457,551 | A | * | 10/1995 | Culter et al. .................. 349/76 |
| 5,835,173 | A | * | 11/1998 | Inbar et al. .................... 349/61 |
| 5,875,012 | A | * | 2/1999 | Crawford et al. ............. 349/74 |
| 5,926,729 | A | * | 7/1999 | Tsai et al. ..................... 438/591 |
| 6,078,371 | A | * | 6/2000 | Ichikawa et al. ............. 349/95 |
| 6,295,106 | B1 | * | 9/2001 | Fukuzawa et al. ............ 349/71 |

* cited by examiner

*Primary Examiner*—Andrew Schechter
*Assistant Examiner*—Phu Vu
(74) *Attorney, Agent, or Firm*—Fleshner & Kim LLP.

(57) ABSTRACT

A display panel and system using a hologram pattern liquid crystal can adjust color and quantity of light selectively for each and every pixel. The display panel includes first and second data lines formed in line in the same direction, the second data lines overlapping with upper parts of the first data lines, first and second scanning lines formed in line in a direction perpendicular to the first and second data lines, the second scanning lines overlapping with upper parts of the first scanning lines, and liquid crystals having hologram patterns formed between the first scanning lines and the first data lines, between the first data lines and the second scanning lines, and between the second scanning lines and the second data lines, respectively.

25 Claims, 7 Drawing Sheets

FIG. 9A a bundle of optical fibers

FIG. 9B optical fiber   pixel

DISPLAY PANEL AND SYSTEM USING A HOLOGRAM PATTERN LIQUID CRYSTAL

This application claims the benefit of the Korean Application No. P2002-56576 filed on Sep. 17, 2002, which is hereby incorporated by reference.

BACKGROUND OF THE INVENTION

1. Field of the Invention

The present invention relates to a display panel and system using a hologram pattern liquid crystal which can adjust color and quantity of light selectively for each and every pixel.

2. Discussion of the Related Art

Recently, a flat type display for implementing a thin and large-sized screen is being watched with keen interest in replacement of the existing Braun-tube display having a small-sized screen and a large-sized system.

Such a display panel is classified into an LCD (Liquid Crystal Display), PDP (Plasma Display Panel), projection system, etc., and the projection display is now in the mainstream.

Generally, the LCD projection system projects light emitted from a light source on an LCD panel, and displays an image of the LCD panel on a screen using a projection optical system.

However, since the LCD projection system directly projects the image of the LCD panel on a rear screen, the projection distance between the screen and the projection optical system should be secured.

Figure 1:
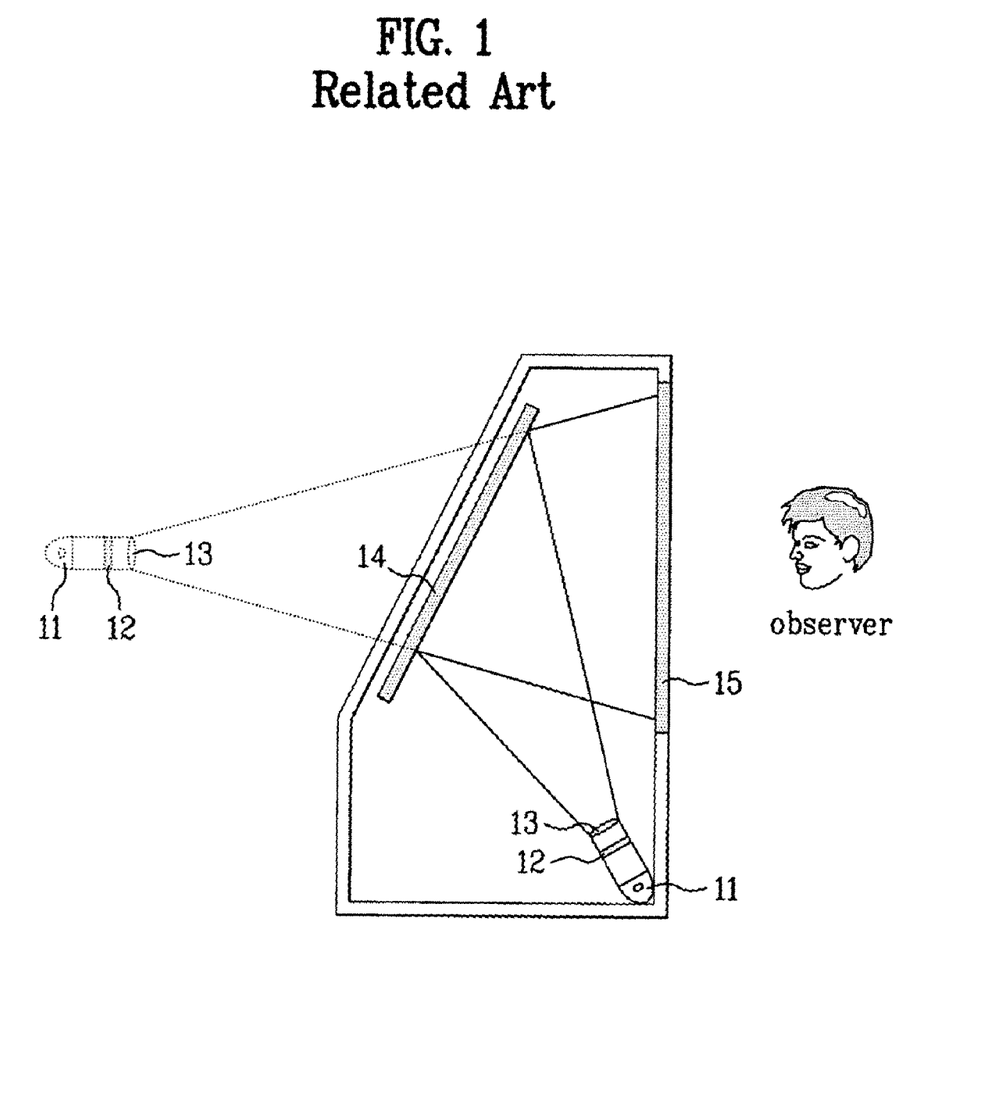
FIG. 1 is a view illustrating a general projection system.

FIG. 1 is a block diagram illustrating the structure of a general LCD projection system.

Referring to FIG. 1, the light emitted from a light source 11 is irradiated onto an LCD panel 12.

Then, the LCD panel 12 displays an image by means of the irradiated light, and this image is enlarged by the projection optical system 13 to be displayed on a rear screen 15.

That is, the image projected by the projection optical system 13 is reflected by a mirror 14, and then travels to the rear screen 15.

If the mirror 14 is not used, but a light source is located behind the rear screen, the thickness of the system will become greatly increased as shown in FIG. 1.

However, the structure of the general projection system has the limitations in reducing the thickness of the system.

The reason for this is that if the angle of the mirror becomes large in order to further reduce the thickness of the system, it is difficult to arrange the projection optical system, while if the angle of the projection optical system becomes large, the image being displayed is distorted.

Consequently, since the general projection system has the limitations in arranging the projection optical system and the mirror and in adjusting the angle of arrangement, it is difficult to reduce the thickness of the whole system.

SUMMARY OF THE INVENTION

Accordingly, the present invention is directed to a display panel and system using a hologram pattern liquid crystal that substantially obviates one or more problems due to limitations and disadvantages of the related art.

An object of the present invention is to provide a display panel and system using a hologram pattern liquid crystal which is suitable for a thin and large-sized screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display panel using a hologram pattern liquid crystal includes first and second data lines formed in line in the same direction, the second data lines overlapping with upper parts of the first data lines, first and second scanning lines formed in line in a direction perpendicular to the first and second data lines, the second scanning lines overlapping with upper parts of the first scanning lines, and liquid crystals having hologram patterns formed between the first scanning lines and the first data lines, between the first data lines and the second scanning lines, and between the second scanning lines and the second data lines, respectively.

Here, the liquid crystal between the first scanning lines and the first data lines, the liquid crystal between the first data lines and the second scanning lines, and the liquid crystal between the second scanning lines and the second data lines have the hologram patterns different from one another.

The hologram pattern of the liquid crystal is formed in a pixel area in which the data line and the scanning line cross each other.

Also, the liquid crystal formed between the first scanning lines and the first data lines adjusts a transmitted light quantity of a red light, the liquid crystal formed between the first data lines and the second scanning lines adjusts a transmitted light quantity of a green light, and the liquid crystal formed between the second scanning lines and the second data lines adjusts a transmitted light quantity of a blue light.

In another aspect of the present invention, there is provided a display system using a hologram pattern liquid crystal including a light source for generating light, first and second data lines formed in line in the same direction, the second data lines overlapping with upper parts of the first data lines, first and second scanning lines formed in line in a direction perpendicular to the first and second data lines, the second scanning lines overlapping with upper parts of the first scanning lines, liquid crystals having hologram patterns formed between the first scanning lines and the first data lines, between the first data lines and the second scanning lines, and between the second scanning lines and the second data lines, respectively, a display panel for displaying an image by selectively adjusting color and quantity of light in accordance with an input image signal, and optical fibers for transmitting the light from the light source to the display panel.

The display system according to the present invention may further include a driving unit for driving the first and second data lines and the first and second scanning lines so that corresponding voltages are inputted to respective pixels of the display panel, a control unit for controlling the driving unit in accordance with the image signal externally inputted, and an optical system formed between the light source and the optical fibers.

Here, the light source is one of a high-voltage mercury lamp, a metal halide lamp, and a white LED, and the optical fibers are arranged corresponding to the respective pixels of the display panel.

Also, the number of optical fibers is the same as the number of pixels of the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
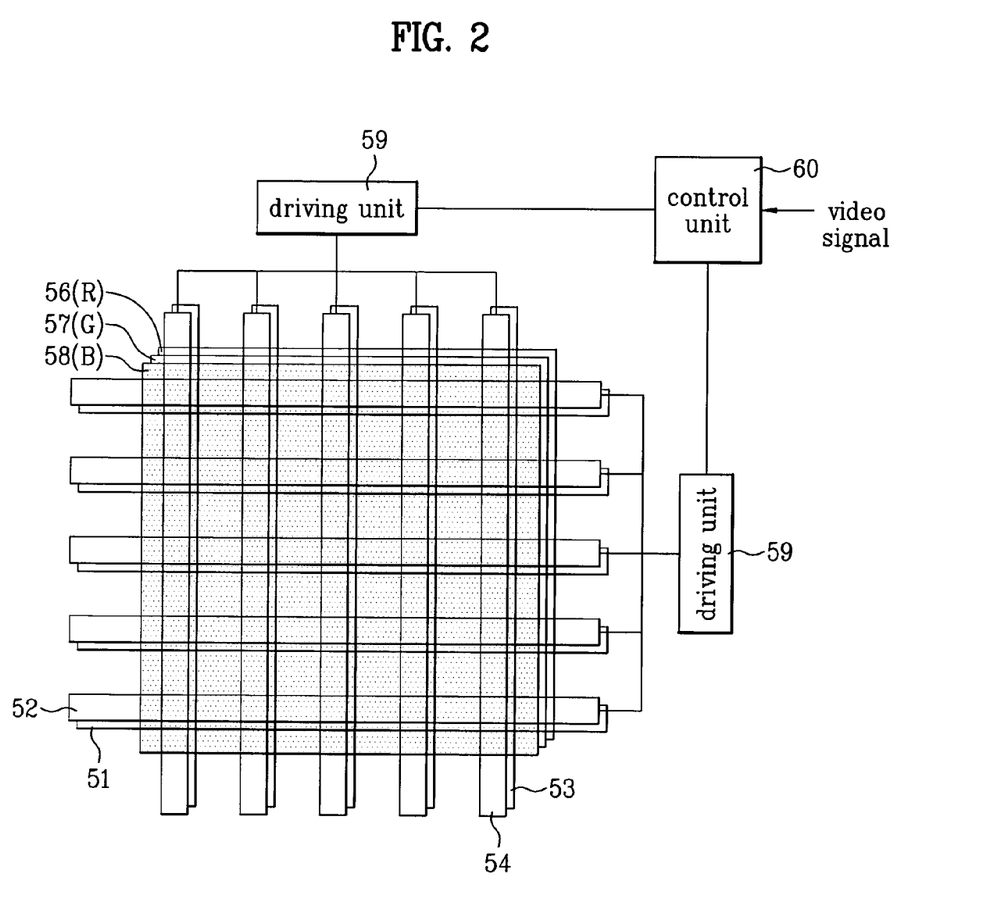
FIG. 2 is a view illustrating a display panel using a hologram pattern liquid crystal of the present invention.
Figure 3:
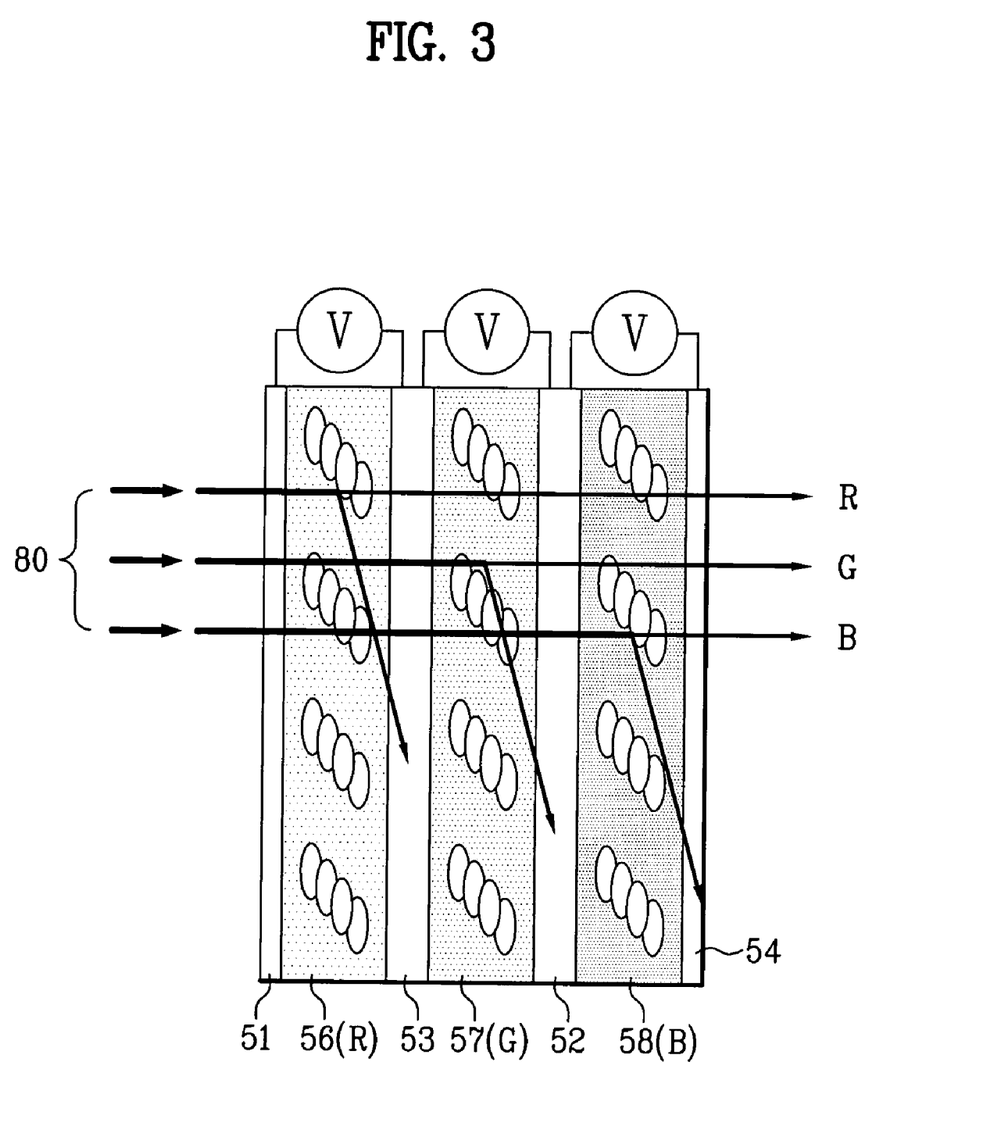
FIG. 3 is a view explaining the color implementation of FIG. 2.

FIG. 2 is a view illustrating a display panel using a hologram pattern liquid crystal of the present invention, and FIG. 3 is a view explaining the color implementation of FIG. 2.

As shown in FIGS. 2 and 3, the display panel according to the present invention includes first and second data lines 53 and 54 formed in line in the same direction, first and second scanning lines 51 and 52 formed in line in a direction perpendicular to the first and second data lines 53 and 54, and RGB liquid crystals 56, 57 and 58 having hologram patterns formed between the lines.

The display panel according to the present invention further includes a driving unit 59 for driving the first and second data lines 53 and 54 and the first and second scanning lines 51 and 52 so that corresponding voltages are inputted to respective pixels of the display panel, and a control unit 60 for controlling the driving unit 59 in accordance with the image signal externally inputted.

Here, the second data lines 54 overlap with upper parts of the first data lines 53, and the second scanning lines 52 overlap with upper parts of the first scanning lines 51.

The RGB liquid crystals 56, 57 and 58 having hologram patterns are formed between the first scanning lines 51 and the first data lines 53, between the first data lines 53 and the second scanning lines 52, and between the second scanning lines 52 and the second data lines 54, respectively.

The first and second data lines 53 and 54 and the first and second scanning lines 51 and 52 are formed as transparent electrodes.

Also, the red liquid crystal 56 between the first scanning lines 51 and the first data lines 53, the green liquid crystal 57 between the first data lines 53 and the second scanning lines 52, and the blue liquid crystal 58 between the second scanning lines 52 and the second data lines 54 have the hologram patterns different from one another.

The hologram pattern of the liquid crystal is formed in a pixel area in which the data line and the scanning line cross each other.

Figure 4A:
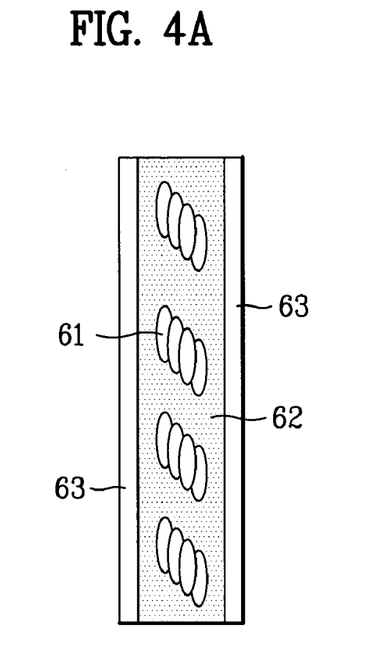
FIGS. 4A and 4B are views illustrating hologram patterns formed in the liquid crystal of an RBG filter.
Figure 4B:
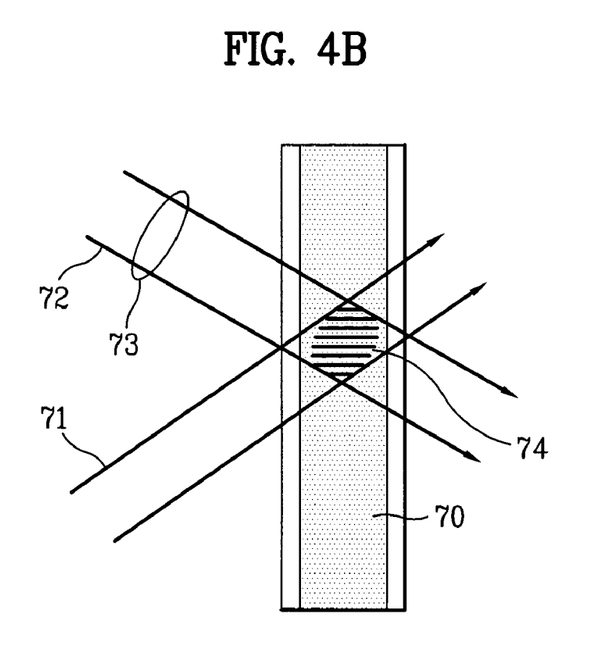

FIGS. 4A and 4B are views illustrating hologram patterns formed in the RGB filter.

Generally, the hologram pattern liquid crystal, as shown in FIG. 4A, comprises liquid crystal molecules 61 which form the hologram pattern between the electrodes 63, and a monomer 62.

The liquid crystal molecules 61 and the monomer 62 are periodically arranged and have a band shape.

Also, the refraction index of the liquid crystal molecules 61 and the refraction index of the monomer 62 are different from each other to form a periodic refraction index lattice.

The hologram pattern liquid crystal constructed as above is formed as follows.

As shown in FIG. 4B, a laser reference light 71 and the laser light 72 are irradiated into a mixed liquid 70 of the liquid crystal and the monomer.

At this time, in the mixed liquid 70 of liquid crystal and monomer, a band-shaped interference pattern is formed due to the phase difference between the two laser lights, and this is called a hologram pattern 74.

Here, the thickness, period, etc., of the hologram pattern 74 can be adjusted by means of a diffractive element 73.

The diffractive element 53 may be a pattern made by a lens or a computer.

The hologram pattern has an arrangement in which a bright polymer area and a dark liquid crystal area periodically alternate due to the irradiation of the laser light.

Figure 5A:
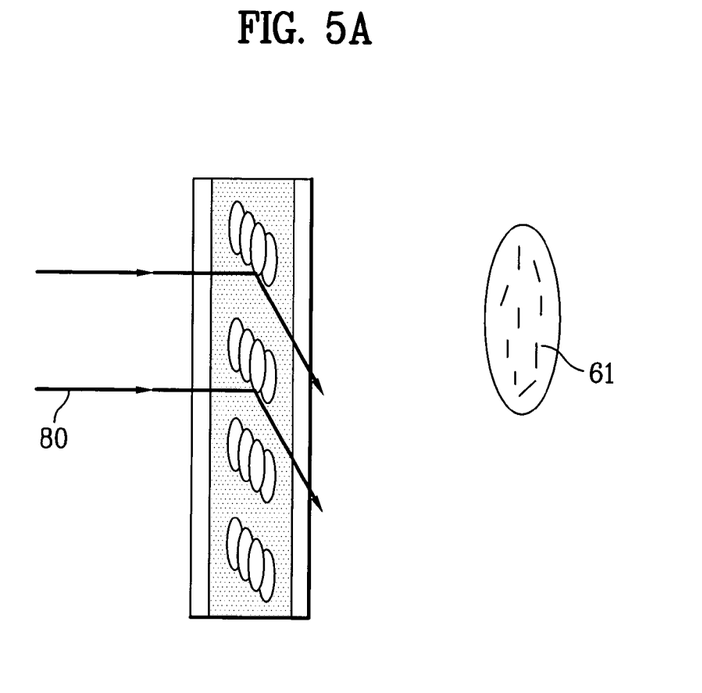
FIGS. 5A and 5B are views explaining the concept of driving a hologram pattern liquid crystal.
Figure 5B:
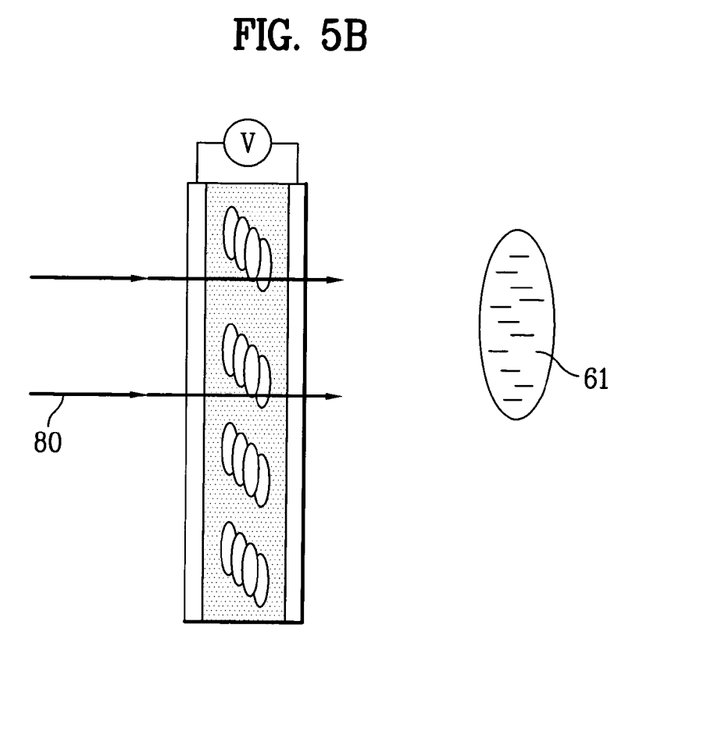
Figure 6:
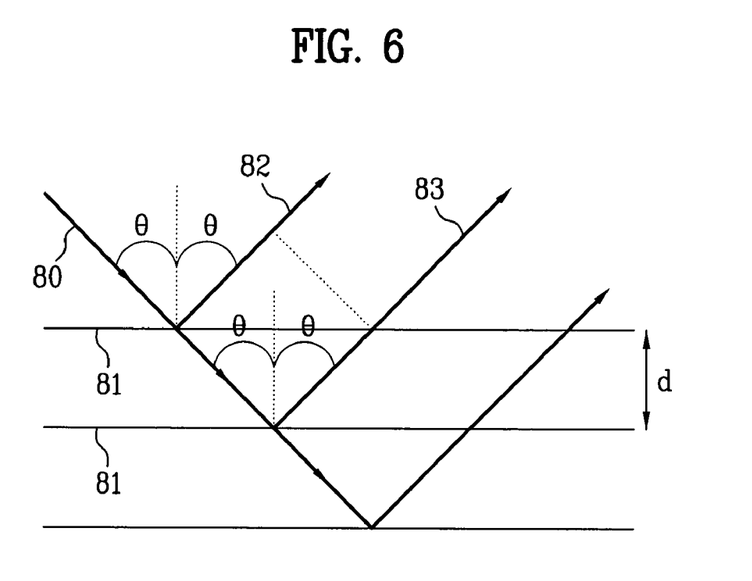
FIG. 6 is a view explaining a periodic lattice of a hologram pattern liquid crystal and the concept of Bragg diffraction.

FIGS. 5A and 5B are views explaining the concept of driving the hologram pattern liquid crystal, and FIG. 6 is a view explaining the periodic lattice of the hologram pattern liquid crystal and the concept of Bragg diffraction.

FIG. 5A shows the case that a voltage is not applied to the hologram pattern liquid crystal, and FIG. 5B shows the case that a voltage is applied to the hologram pattern liquid crystal.

As shown in FIG. 5A, if the voltage is not applied to the hologram pattern liquid crystal, the incident light 80 is diffracted through the refraction index lattice of the hologram pattern.

That is, the incident light 80 is diffracted by the Bragg phenomenon appearing in the lattice having a constant period.

If the voltage is not applied to the hologram pattern liquid crystal, the liquid crystal molecules 61 are arranged irregularly, the incident light cannot permeate the liquid crystal molecules, and the periodic lattice by the difference between the refraction index of the liquid crystal and the refraction index of the monomer is maintained.

Accordingly, the hologram pattern liquid crystal has the refraction index having a constant period, and the incident light is diffracted.

As shown in FIG. 5B, if the voltage is applied to the hologram pattern liquid crystal, the incident light 80 permeates the hologram pattern liquid crystal.

This is because the liquid crystal molecules 61 are arranged in the same direction by the applied voltage.

The refraction index of the liquid crystal molecules 61 and the refraction index of the monomer become identical by the arrangement of the liquid crystal molecules, and thus the refraction index lattice is not formed in the hologram pattern liquid crystal.

Accordingly, the incident light 80 directly permeates the hologram pattern liquid crystal.

Also, the transmitted light quantity of the incident light 80 is adjusted in accordance with the level of the applied voltage.

Meanwhile, the wavelength of the incident light 80 has connection with the period and space of the refraction index lattice. Accordingly, by adjusting the period and space of the refraction index lattice, the light of a desired wavelength can selectively be obtained.

As shown in FIG. 6, the incident light 80 is reflected from the refraction index lattice 81 having a constant space to be the first and second reflected lights 82 and 83.

The first and second reflected lights 82 and 83 have a specified wavelength that satisfies the condition of the following equation according to a reinforcement interference phenomenon occurring due to the phase difference.

$$d\cos\vartheta = m\lambda \quad \text{[Equation 1]}$$

Here, m is an integer, and d is a pitch.

The hologram pattern liquid crystal can selectively adjust the wavelength and light quantity of an incident light, and thus can be used as a filter for a specified color.

Now, the color implementation according to the present invention will be explained.

As shown in FIG. 3, the red liquid crystal 56 having the hologram pattern is formed between the first scanning line 51 and the first data line 53, the green liquid crystal 57 having the hologram pattern is formed between the first data line 53 and the second scanning line 52, and the blue liquid crystal 58 having the hologram pattern is formed between the second scanning line 52 and the second data line 54.

First, if a voltage is applied only to the red liquid crystal 56, the red wavelength of the incident light 80 is selected and transmitted through the refraction index lattice of the hologram pattern, and its light quantity is adjusted according to the level of the applied voltage.

At this time, a portion of the incident light 80 is diffracted by the refraction index lattice of the hologram pattern.

Here, in manufacturing the display panel according to the present invention, the angle of the incident light, period and space of the refraction index lattice, etc., are adjusted so that the diffracted light is irradiated to other areas in addition to the display panel.

The green light and the blue light, which were not selected by the red liquid crystal 56, transmit and travel through the red liquid crystal 56 as they are.

Then, if a voltage is applied only to the green liquid crystal 57, the green wavelength of the incident light 80 is selected and transmitted through the refraction index lattice of the hologram pattern, and its light quantity is adjusted according to the level of the applied voltage.

At this time, a portion of the incident light 80 is diffracted by the refraction index lattice of the hologram pattern.

The red light and the blue light, which were not selected by the green liquid crystal 57, transmit and travel through the green liquid crystal 57 as they are.

Next, if a voltage is applied only to the blue liquid crystal 58, the blue wavelength of the incident light 80 is selected and transmitted through the refraction index lattice of the hologram pattern, and its light quantity is adjusted according to the level of the applied voltage.

At this time, a portion of the incident light 80 is diffracted by the refraction index lattice of the hologram pattern.

The red light and the green light, which were not selected by the blue liquid crystal 58, transmit and travel through the blue liquid crystal 58 as they are.

By the above-described method, a respective pixel displays the corresponding color.

In the case of implementing the red on the corresponding pixel, the voltage is not applied to the green liquid crystal 57 and the blue liquid crystal 58, but is applied only to the red liquid crystal 56. Thus, the red image pixel is implemented by selectively transmitting the red light and adjusting the light quantity.

In the case of implementing the white image on the corresponding pixel, the voltages corresponding to the color are applied to the red liquid crystal 56, the green liquid crystal 57 and the blue liquid crystal 58, respectively.

Figure 7:
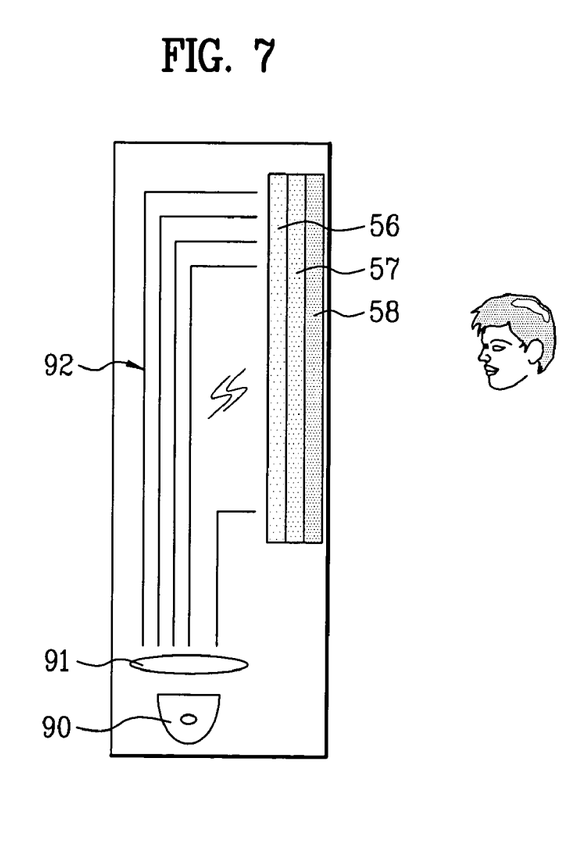
FIG. 7 is a view illustrating a projection system using a hologram pattern liquid crystal of the present invention.

FIG. 7 is a view illustrating a projection system using a hologram pattern liquid crystal according to the present invention.

As shown in FIG. 7, the projection system according to the present invention includes a light source 90, a display panel composed of a red liquid crystal 56, a green liquid crystal 57 and a blue liquid crystal 58 having hologram patterns, optical fibers 92 for transmitting the light from the light source 90 to the display panel, an optical system formed between the light source 90 and the optical fibers.

Also, the display panel further includes a driving unit (not illustrated) for driving the electrodes, and a control unit (not illustrated) for controlling the driving unit in accordance with an image signal externally inputted.

Here, the light source 90 is one of a high-voltage mercury lamp, a metal halide lamp, and a white LED.

The optical system 91 gathers the lights generated from the light source 90, and makes the gathered lights incident to the optical fibers 92. The optical fibers 92 transfers the incident lights to the respective pixels of the display panel.

Here, the optical fibers 92 are arranged so as to correspond to the respective pixels, and the number of optical fibers 92 are the same as the number of pixels of the display panel.

The projection system according to the present invention may not require the optical system 91 in accordance with the light generated from the light source 90.

Figure 8:
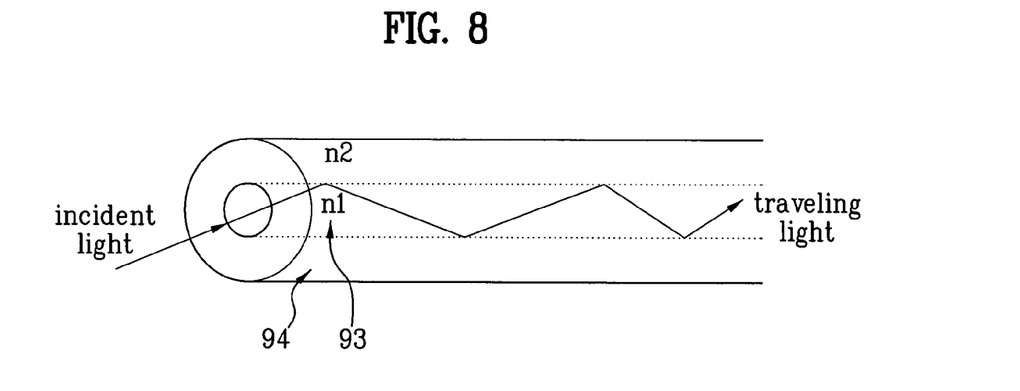
FIG. 8 is a view illustrating the structure of an optical fiber of FIG. 7.
Figure 9A:
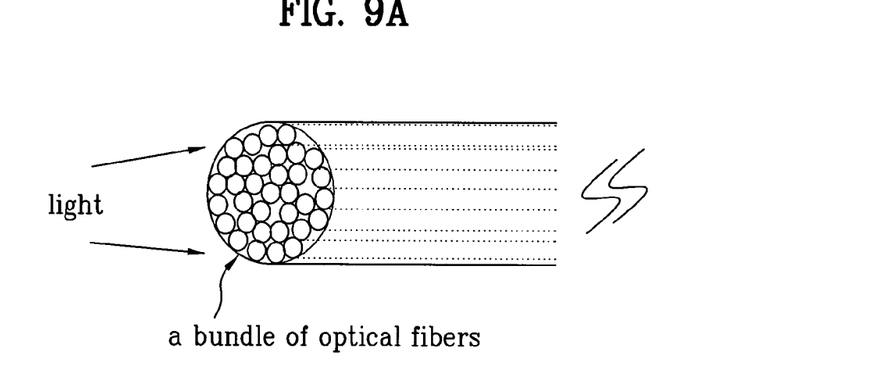
FIG. 9A is a view illustrating a light incidence unit of the optical fibers of FIG. 7.

FIG. 8 is a view illustrating the structure of an optical fiber of FIG. 7. FIG. 9A is a view illustrating a light incidence unit of the optical fibers of FIGS. 7, and FIG. 9B is a view illustrating a light emission unit of the optical fibers of FIG. 7.

As shown in FIG. 8, the optical fiber 90 is composed of a core 93 and a cladding 94 surrounding the core.

Since the refraction index n1 of the core 93 is greater than the refraction index n2 of the cladding 94, the incident light of totally reflected and travels along the core 93.

Figure 9B:
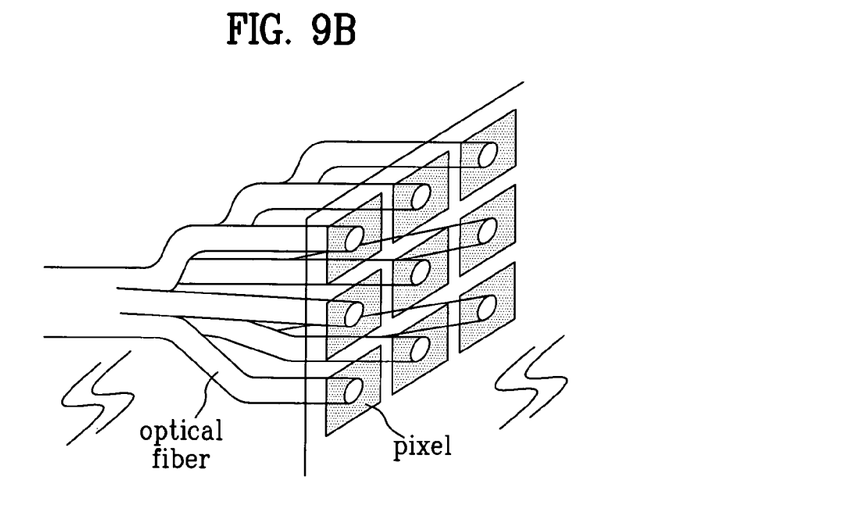
FIG. 9B is a view illustrating a light emission unit of the optical fibers of FIG. 7.

The incidence unit of the optical fibers 92, as shown in FIG. 9A, forms a bundle of optical fibers, and the emission unit of the optical fibers 92, as shown in FIG. 9B, forms the separately arranged optical fibers which correspond to the respective pixels.

The light incident to the optical fibers is transferred to the optical fiber emission unit, emitted from the optical fiber emission unit, and then irradiated onto the respective pixels.

The quantity of light irradiated onto the respective pixels of the screen is adjusted by the corresponding voltage applied to the hologram liquid crystal filter in accordance with the corresponding image signal, and thus the image is displayed on the screen.

As described above, since the display panel and system according to the present invention uses the hologram pattern liquid crystal, it is suitable for a thin and large-sized screen.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display panel using a hologram pattern liquid crystal comprising:
   first and second data lines formed in line in the same direction, the second data lines overlapping with upper parts of the first data lines so that the first and second data lines are offset;
   first and second scanning lines formed in line in a direction perpendicular to the first and second data lines, the second scanning lines overlapping with upper parts of the first scanning lines so that the first and second scanning lines are offset; and
   liquid crystals having hologram patterns formed between the first scanning lines and the first data lines, between the first data lines and the second scanning lines, and between the second scanning lines and the second data lines, respectively.

2. The display panel of claim 1, further comprising:
   a driving unit for driving the first and second data lines and the first and second scanning lines; and
   a control unit for controlling the driving unit in accordance with the image signal externally inputted.

3. The display panel of claim 1, wherein the first and second data lines and the first and second scanning lines are transparent electrodes.

4. The display panel of claim 1, wherein the liquid crystal between the first scanning lines and the first data lines, the liquid crystal between the first data lines and the second scanning lines, and the liquid crystal between the second scanning lines and the second data lines have the hologram patterns different from one another.

5. The display panel of claim 1, wherein the hologram pattern of the liquid crystal is formed in a pixel area in which the data line and the scanning line cross each other.

6. The display panel of claim 1, wherein the liquid crystal formed between the first scanning lines and the first data lines adjusts a transmitted light quantity of a red light, the liquid crystal formed between the first data lines and the second scanning lines adjusts a transmitted light quantity of a green light, and the liquid crystal formed between the second scanning lines and the second data lines adjusts a transmitted light quantity of a blue light.

7. The display panel of claim 1, wherein the liquid crystal is composed of liquid crystal molecules having the hologram pattern and a monomer, and wherein the liquid crystal molecules and the monomer are periodically arranged to have a band shape.

8. The display panel of claim 7, wherein the hologram pattern is formed as a band-shaped interference pattern due to a phase difference between a laser reference light and the laser light irradiated onto a mixed liquid of the liquid crystal molecules and the monomer.

9. A display system using a hologram pattern liquid crystal comprising:
   a light source for generating light;
   a display panel for displaying an image by selectively adjusting color and quantity of light in accordance with an input image signal, the display panel comprising first and second data lines formed in line in the same direction the second data lines overlapping with upper parts of the first data lines so that the first and second data lines are offset, first and second scanning lines formed in line in a direction perpendicular to the first and second data lines, the second scanning lines overlapping with upper parts of the first scanning lines so that the first and second scanning lines are offset, liquid crystals having hologram patterns formed between the first scanning lines and the first data lines, between the first data lines and the second scanning lines, and between the second scanning lines and the second data lines, respectively; and
   optical fibers for transmitting the light from the light source to the display panel.

10. The display system of claim 9, further comprising:
    a driving unit for driving the first and second data lines and the first and second scanning lines so that corresponding voltages are inputted to respective pixels of the display panel;
    a control unit for controlling the driving unit in accordance with the image signal externally inputted; and
    an optical system formed between the light source and the optical fibers.

11. The display system of claim 9, wherein the light source is one of a high-voltage mercury lamp, a metal halide lamp, and a white LED.

12. The display system of claim 9, wherein the first and second data lines and the first and second scanning lines are transparent electrodes.

13. The display system of claim 9, wherein the liquid crystal between the first scanning lines and the first data lines, the liquid crystal between the first data lines and the second scanning lines, and the liquid crystal between the second scanning lines and the second data lines have the hologram patterns different from one another.

14. The display system of claim 9, wherein the hologram pattern of the liquid crystal is formed in a pixel area in which the data line and the scanning line cross each other.

15. The display system of claim 9, wherein the liquid crystal formed between the first scanning lines and the first data lines adjusts a transmitted light quantity of a red light, the liquid crystal formed between the first data lines and the second scanning lines adjusts a transmitted light quantity of a green light, and the liquid crystal formed between the second scanning lines and the second data lines adjusts a transmitted light quantity of a blue light.

16. The display system of claim 9, wherein the liquid crystal is composed of liquid crystal molecules having the hologram pattern and a monomer, and wherein the liquid crystal molecules and the monomer are periodically arranged to have a band shape.

17. The display system of claim 16, wherein the hologram pattern is formed as a band-shaped interference pattern due to a phase difference between a laser reference light and the laser light irradiated onto a mixed liquid of the liquid crystal molecules and the monomer.

18. The display system of claim 9, wherein the optical fibers are arranged corresponding to the respective pixels of the display panel.

19. The display system of claim 9, wherein the number of optical fibers is the same as the number of pixels of the display panel.

20. The display panel of claim 1, wherein the first and second data lines have substantially the same width, and the first and second scanning lines have substantially the same width.

21. The display system of claim 9, wherein the first and second data lines have substantially the same width, and the first and second scanning lines have substantially the same width.

22. A display panel, comprising:
   first and second data lines formed in a first direction;
   first and second scanning lines formed in a second direction; and
   liquid crystal having hologram patterns, which are formed between the first scanning lines and the first data lines, between the first data lines and the second scanning lines, and between the second scanning lines and the second data lines, respectively, wherein at least one of the second data lines partially cover the first data lines or at least one of the second scanning lines partially cover the first scanning line.

23. The display panel of claim 22, wherein the first and second directions are substantially perpendicular.

24. A display system including the display panel of claim 22, and further comprising:
   a light source for generating light; and
   optical fibers for transmitting the light from the light source to the display panel.

25. The display panel of claim 22, wherein the first data lines and the at least one of the second data lines are offset, and the first scanning lines and the at least one of the second scanning lines are offset.

* * * * *